Patented Oct. 25, 1927.

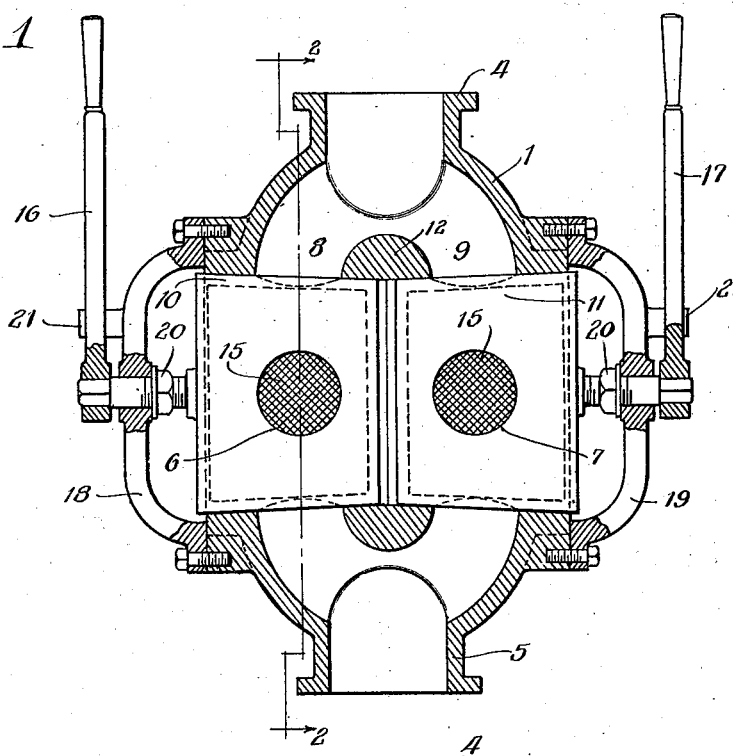
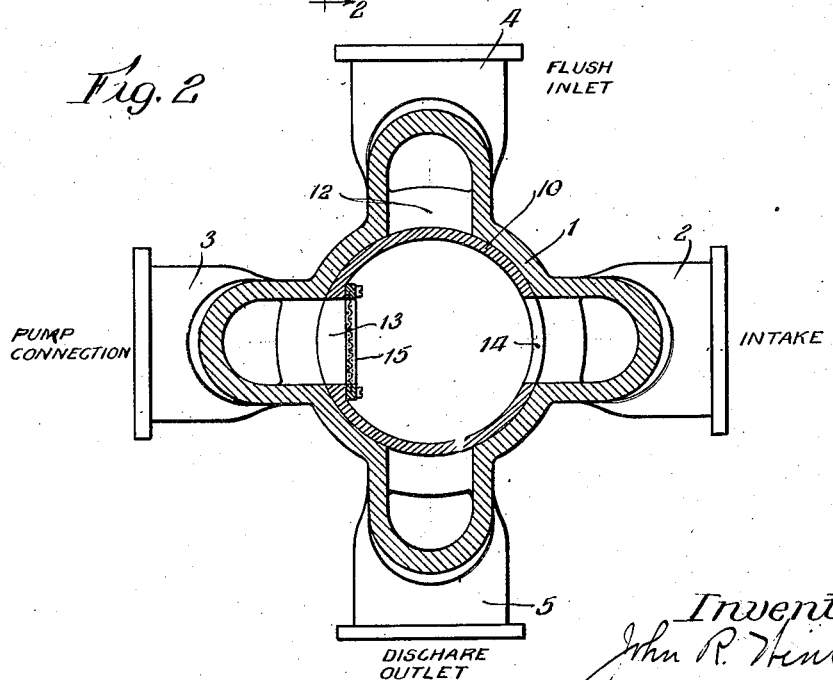

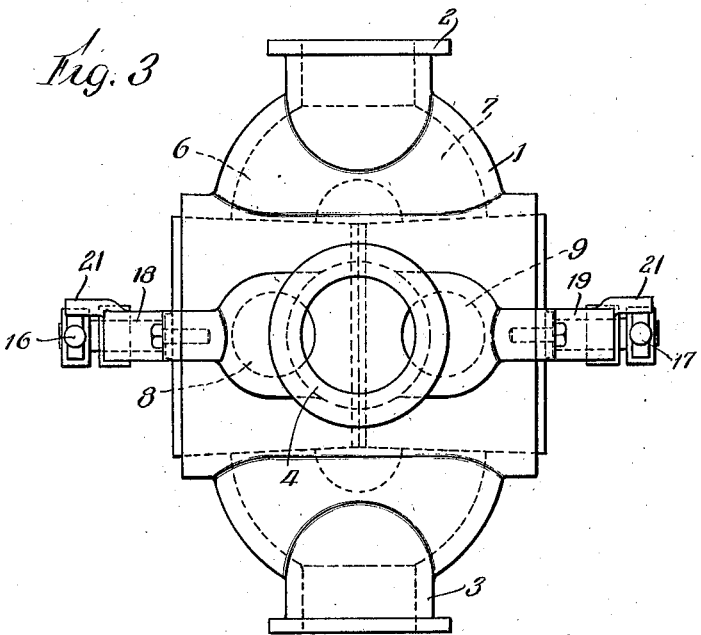
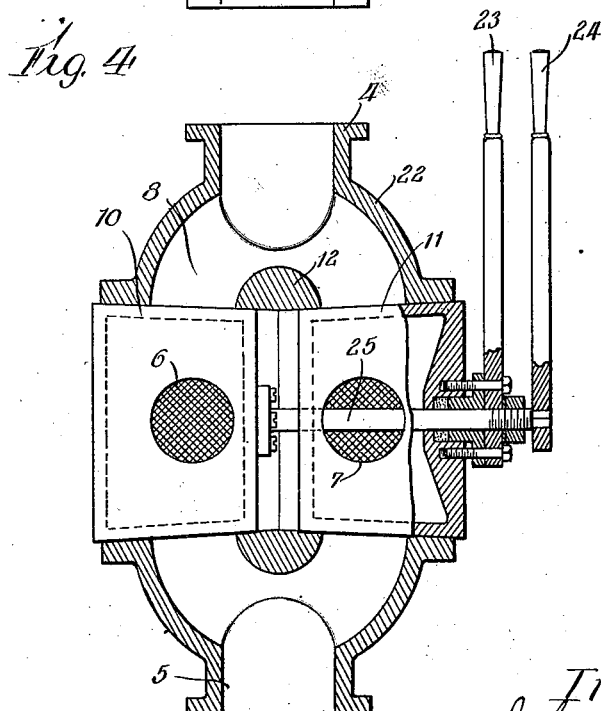

1,646,514

UNITED STATES PATENT OFFICE.

JOHN R. WINTON, OF CHICAGO, ILLINOIS, ASSIGNOR TO MECHANICAL APPLIANCE COMPANY, OF CHICAGO, ILLINOIS, A CORPORATION OF ILLINOIS.

WATER-LINE TRAP.

Application filed April 18, 1925. Serial No. 24,017.

This invention relates to a novel and improved water-line trap which is particularly adapted for use in a suction system but it may also be employed to use in a system employing pressure. The primary object of my invention is to provide a trap which may be readily placed in existing pipe lines and which shall effectively screen the water passing therethrough.

A still further object of my invention is to provide a trap of the above character which may be readily and efficiently cleaned without any interruption of the supply of water.

A still further object of my invention is to provide a trap which shall consist of a single unit embodying all of the valves which are necessary to control the flow of water therethrough and to clean the same, so that the unit may be placed in a desired position in a water-line and shall then be ready for immediate use without the necessity of providing further valves or other devices.

In the accompanying drawings in which I have shown selected embodiments of my invention:

Fig. 1 is a transverse section through one form of trap embodying my invention.

Fig. 2 is a section on the line 2—2 of Fig. 1.

Fig. 3 is a plan view of this form of my invention.

Fig. 4 is a section corresponding to Fig. 1 but showing another form which my invention may take.

Referring now to the drawings and particularly to Figs. 1, 2 and 3 the numeral 1 designates a housing having an intake 2 for the reception of water, a pump connection 3, a flush inlet 4 and a discharge outlet 5. The intake 2 is in line with the pump connection 3 and the flush inlet 4 and discharge outlet 5 are also substantially in line with each other and at substantially right angles to the line defined by the intake and pump connection. It will be seen that the device is being described as in use with a suction system in which the pump connection will be in the position shown.

The water-line of which the intake and pump connection form a part is divided into two branches 6 and 7 substantially parallel to each other. Likewise the line formed by the flush inlet 4 and discharge outlet 5 is divided into two branches 8 and 9 substantially parallel to each other and intersecting the branches 6 and 7 respectively at approximately right angles. The branches 6 and 7 and 8 and 9 are controlled by suitable valves and for this purpose I provide a valve in the form of a hollow truncated cone or a cylinder. These valves are placed at the intersection of the branches 6 and 8 and the branches 7 and 9 respectively the valve 10 being placed at the first of these intersections and the valve 11 at the second. The valves 10 and 11 are rotated in the walls of the housing 1 and in the central partition 12 dividing the branches 6 and 7 and the branches 8 and 9 respectively.

Referring particularly to Fig. 2, it will be seen that each valve is provided with aligned openings 13 and 14, the opening 13 being closed by a suitable screen 15. The openings 13 and 14 form a single passage through the valve and are adapted to register with the intake and pump connection or with the flush inlet and discharge outlet, the valve being rotatable in the housing 1 for that purpose. It is important that the wall of the valve should be so proportioned in respect to the openings therein that only one set of these openings will be uncovered at a time so as to avoid entrance of air to the line through the flush inlet or discharge outlet. That is, when the valve 10 is rotated from the position shown in Fig. 2 to a position wherein the openings 13 and 14 will be in line with the flush inlet and discharge outlet, it is important that the openings 13 and 14 shall be closed before the inlet and outlet are uncovered at all.

The valves may be rotated in any suitable manner as by handles 16 and 17 supported in brackets 18 and 19. Takeup nuts 20 are provided upon the threaded stems of the valves so as to provide a means for compensating for wear upon the valves. Suitable stop lugs 21 may be provided for limiting the movement of the handles.

In operation both of the valves 10 and 11 are normally in the position shown in Figs. 1 and 2, wherein the water may be pumped freely therethrough, the screen 15 serving to stop the passage of refuse therethrough. This refuse will accumulate in the bottom of the valve which forms a collecting chamber therefor. When it is desired to clean the trap all that is necessary is to operate one of the handles 16 or 17 to rotate the valve clockwise (Fig. 2). The pump connection and the intake will be closed before the flush inlet and discharge outlet are opened and the entrance of air to the waterline will thereby be avoided. As the openings 13 and 14 are brought into alignment with the flush inlet and discharge outlet the refuse which has been accumulated in the valve will naturally be still retained in the bottom portion of the valve and pass through the opening 14 into the discharge outlet. The flush inlet is connected with any suitable source of water supply which is controlled by the valves 10 and 11, this water preferably being water which has already been screened. This water will force the refuse which has collected on the screen away therefrom and flush the entire contents of the valve out through the discharge outlet thereby effectively cleaning the entire collecting chamber. During this operation the water is still flowing through the other branch of the line and therefore the supply of water is uninterrupted. The entire operation takes only a few seconds at the most and all that is necessary is a movement of a handle through 90° and back again. No sequence of operations is required and therefore there is no need of a skilled attendant.

Referring now to Fig. 4, the housing 22 is substantially identical with the housing 1, being divided into branches 6, 7, 8 and 9 in the same manner, said branches also being controlled by the valves 10 and 11. However, in this form I place both handles on one side of the trap, the handle 23 being secured directly to the valve 11 and the handle 24 having a stem 25 passing through the valve 11 and connected to the valve 10. The operation of this form of my invention is identical in all respects with the mode of operation of the other form.

From the above it will be apparent that I have provided a trap which may be readily placed in an existing water-line and which will effectively prevent the passage of refuse, but which may at the same time be readily cleaned without the necessity of interrupting the supply of water. While I have referred throughout my description of my invention to the trap as being used in a water-line, of course, it is understood that it may also be used in any other type of line wherein it may find utility. While I have described my invention also as used in a suction system it is, of course, obvious that it may be used with equal facility in a pressure system, although in that case it is not so necessary to have two branches in the line.

I am aware that changes in the form, construction and arrangement of parts may be made without departing from the spirit and without sacrificing the advantages of the invention and I reserve the right to make all such changes as fairly fall within the scope of the following claims.

I claim:

1. A trap adapted to be placed in a water-line, said trap being provided with two branches for said water-line, a second water-line passing through said trap and having two branches intersecting the respective branches of said first line, screen valves at the intersections of said branches, and means for operating the valves to divert water through either branch of one line when the other branch is closed.

2. A trap adapted to be placed in a water-line, said trap being provided with two branches for said water-line, a second water-line passing through said trap and having two branches intersecting the respective branches of said first line, screen valves at the intersections of said branches, each valve controlling a pair of said intersecting branches, and means for operating the valves independently for connecting either of the intersecting branches when the other branches are not being used.

3. A trap adapted to be placed in a water-line and having two separate water-lines passing therethrough, each line having two branches intersecting within the trap, a quarter-turn hollow valve arranged at said intersection of the branches and having a passage therethrough, and a screen across said passage adjacent one end thereof, said screened end of the passage constituting the outlet end of the passage when the passage is alined with one water-line and constituting the inlet end of the passage when the passage is alined with the other water line.

4. A trap adapted to be placed in a water-line and having two separate water-lines passing therethrough, each line having two branches intersecting within the trap, a hollow valve arranged in said intersection of the branches and having oppositely disposed openings therein constituting a passage through the valve and registering with either of the branches of said water-lines in the trap, means for operating said valve in a quarter-turn, and a screen arranged across said passage, said screen being located at the discharge end of the passage when the passage is registered with one water-line and at the inlet end of the passage when the passage is registered with the other water-line, whereby the hollow valve constitutes a trap for foreign matter in the first position of the passage and the unscreened end of the passage constitutes an outlet for said foreign matter in the second position of the passage.

5. A trap adapted to be placed in a water-line and having two intersecting water-lines therethrough, each of said water-lines having two branches, a valve at the intersection of the branches of each pair of water-lines, each of said valves having a passage therethrough screened at one end, and means for operating said valves a quarter turn and independently of each other, to connect either of the intersecting branches so one branch can be cleaned while the other is in use.

6. A trap adapted to be placed in a water-line and comprising means for the passage of water therethrough in two separate lines at angles to each other, said lines having two branches intersecting each other, a valve at each intersection for closing one of said lines when the other is open, and a screen carried by said valve, the water passing through said trap in one line striking said screen on one side and the water passing through said trap in said other line striking said screen on the other side thereof when said screen is brought into said lines respectively.

7. A trap adapted to be placed in a water-line, said trap being provided with two branches for said water-line, and a second water-line passing through said trap and having two branches intersecting the respective branches of said first line, and valves at the intersections of said branches, each valve controlling one pair of said intersecting branches and provided with a screen adapted to be brought into either of said lines.

8. A trap adapted to be placed in a water-line, said trap being provided with two branches for said water-line, and a second water-line passing through said trap and having two branches intersecting the respective branches of said first line, and valves at the intersections of said branches, each valve controlling one pair of said intersecting branches and provided with a screen adapted to be brought into either of said lines, the water in said first named line striking the screen on one side and the water in said other line striking the screen on the other side thereof when said screen is brought into said lines respectively.

9. A trap adapted to be placed in a water-line, said trap being provided with two branches for said water-line, and a second water-line passing through said trap and having two branches intersecting the respective branches of said first line, and valves at the intersections of said branches, each valve controlling one pair of said intersecting branches and provided with a screen adapted to be brought into either of said lines, and independent means for operating said valves.

10. A trap comprising a housing and having two water-lines, each of said lines having two branches intersecting within said housing, a hollow valve at each intersection and provided with aligned openings adapted to register with either of said lines and a screen over one of said openings, the other opening being clear.

JOHN R. WINTON.